United States Patent
Pang et al.

(10) Patent No.: US 12,026,604 B2
(45) Date of Patent: Jul. 2, 2024

(54) MEMORY PRE-ALLOCATION FOR FORWARD CALCULATION IN A NEURAL NETWORK

(71) Applicant: NEXTVPU (SHANGHAI) CO., LTD., Shanghai (CN)

(72) Inventors: Jun Pang, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 880 days.

(21) Appl. No.: 16/953,275

(22) Filed: Nov. 19, 2020

(65) Prior Publication Data

US 2021/0142154 A1 May 13, 2021

Related U.S. Application Data

(63) Continuation of application No. PCT/CN2020/121046, filed on Oct. 15, 2020.

(30) Foreign Application Priority Data

Nov. 11, 2019 (CN) .......................... 201911092427.8

(51) Int. Cl.
*G06F 12/00* (2006.01)
*G06F 3/06* (2006.01)
(Continued)

(52) U.S. Cl.
CPC ........... *G06N 3/063* (2013.01); *G06F 3/0604* (2013.01); *G06F 3/0631* (2013.01); *G06F 3/064* (2013.01);
(Continued)

(58) Field of Classification Search
CPC ..... G06N 3/063; G06F 3/0604; G06F 3/0631; G06F 3/064; G06F 3/0655; G06F 3/0673
See application file for complete search history.

(56) References Cited

U.S. PATENT DOCUMENTS

2015/0067262 A1 3/2015 Uttamchandani et al.
2016/0342890 A1 11/2016 Young
(Continued)

FOREIGN PATENT DOCUMENTS

CN 104951370 A 9/2015
CN 108304265 A 7/2018
(Continued)

OTHER PUBLICATIONS

English language machine translation of CN 108829610A (Year: 2018).*

(Continued)

*Primary Examiner* — John A Lane
(74) *Attorney, Agent, or Firm* — WOMBLE BOND DICKINSON (US) LLP

(57) ABSTRACT

Provided are a method for pre-allocating memory, an electronic device, and a medium. The method comprises: attempting to obtain a memory block identifier from a list of idle memory block identifiers for each output from each layer; if the memory block identifier is obtained, storing an identifier of the output and the memory block identifier into a mapping table and deleting the memory block identifier from the list of idle memory block identifiers; or if not obtained, creating a new memory block identifier, storing an identifier of the output and the new memory block identifier into a mapping table, and putting the new memory block identifier into a general list of memory block identifiers; for each input to a current layer, putting a memory block identifier corresponding to the input into the list of idle
(Continued)

memory block identifiers if the input is not used as an input to a subsequent layer.

20 Claims, 7 Drawing Sheets

(51) Int. Cl.
  *G06N 3/02* (2006.01)
  *G06N 3/063* (2023.01)
(52) U.S. Cl.
  CPC .......... *G06F 3/0655* (2013.01); *G06F 3/0673* (2013.01); *G06N 3/02* (2013.01)

(56) References Cited

U.S. PATENT DOCUMENTS

| | | | |
|---|---|---|---|
| 2019/0042925 A1 | 2/2019 | Choe et al. | |
| 2019/0188570 A1* | 6/2019 | Aldea Lopez | G06N 3/084 |
| 2019/0303762 A1 | 10/2019 | Sui et al. | |
| 2021/0089355 A1* | 3/2021 | Huang | G06F 12/023 |
| 2021/0375358 A1* | 12/2021 | Rom | G06N 3/045 |

FOREIGN PATENT DOCUMENTS

| | | |
|---|---|---|
| CN | 108829610 A | 11/2018 |
| CN | 108874532 A | 11/2018 |
| CN | 109491784 A | 3/2019 |
| CN | 109815162 A | 5/2019 |
| CN | 110597616 A | 12/2019 |
| KR | 1020170000109 A | 1/2017 |
| WO | 2018071546 A1 | 4/2018 |
| WO | 2019165316 A1 | 8/2019 |

OTHER PUBLICATIONS

Cao Hai-Tao, et al., "Algorithm of Dynamic Memory Allocation Base on Multimap," Computer Knowledge and Technology, Oct. 2016, pp. 222-224, vol. 12, No. 30, English Abstract.
Xu Ran, et al., "A Data Coping Method Saving Storage Space of Data," Modern Electronic Technology, 2001, pp. 57-58, No. 8, English Abstract.

* cited by examiner

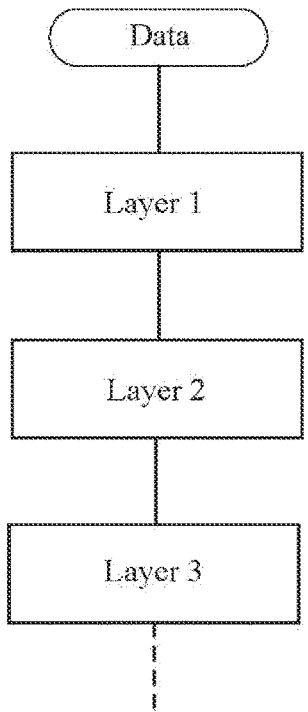
Fig. 2
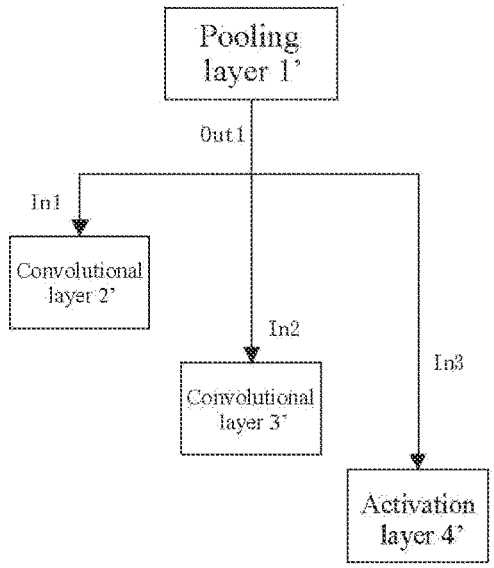
Fig. 3
List of idle memory block identifiers 801
| Memory block identifier 1 (MID1) | Memory block identifier 2 (MID2) | ...... | Memory block identifier n (MIDn) |
|---|---|---|---|
Fig. 4

Mapping table of outputs and memory block identifiers 802

| Output identifier 1 (OID1) | Output identifier 2 (OID2) | ...... | Output identifier p (OIDp) |
|---|---|---|---|
| Memory block identifier 1 (MID1) | Memory block identifier 2 (MID2) | ...... | Memory block identifier p (MIDp) |

General list of memory block identifiers 803

| Memory block identifier 1 (MID1) | Memory block identifier 2 (MID2) | ...... | Memory block identifier t (MIDt) |
|---|---|---|---|

Set of inputs 804

| Input identifier 1 (IID1) | Input identifier 2 (IID2) | ...... | Input identifier k (IIDk) |
|---|---|---|---|
| Data size 1 (Data-In1) | Data size 2 (Data-In2) | ...... | Data size k (Data-Ink) |
| Pointer 1 (In-Pointer1) | Pointer 2 (In-Pointer2) | ...... | Pointer k (In-Pointerk) |

*Fig. 8A*

Set of outputs 805

| Output identifier 1 (OID1) | Output identifier 2 (OID2) | ...... | Output identifier m (OIDm) |
|---|---|---|---|
| Data size 1 (Data-Out1) | Data size 2 (Data-Out2) | ...... | Data size m (Data-Outm) |
| Pointer 1 (Out-Pointer1) | Pointer 2 (Out-Pointer2) | ...... | Pointer m (Out-Pointerm) |

*Fig. 8B*

Correspondence table of outputs and the number of times of citation 806

| Output identifier 1 (OID1) | Output identifier 2 (OID2) | ...... | Output identifier j (OIDj) |
|---|---|---|---|
| Times cited 1 (NM1) | Times cited 2 (NM2) | ...... | Times cited j (NMj) |

*Fig. 9*

Mapping table of used memory block identifiers and capacities 807

| Memory block identifier 1 (MID1) | Memory block identifier 2 (MID2) | ...... | Memory block identifier q (MIDq) |
|---|---|---|---|
| Memory capacity 1 (MS1) | Memory capacity 2 (MS2) | ...... | Memory capacity q (MSq) |
| Data type 1 (DT1) | Data type 2 (DT2) | ...... | Data type q (DTq) |

MEMORY PRE-ALLOCATION FOR FORWARD CALCULATION IN A NEURAL NETWORK

CROSS REFERENCE TO RELATED APPLICATIONS

This application is a continuation of International Application No. PCT/CN2020/121046 file on Oct. 15, 2020, which claims priority to Chinese Patent Application No. 201911092427.8, filed on Nov. 11, 2019. The contents of the above applications are herein incorporated by reference in their entirety for all purposes.

TECHNICAL FIELD

The present disclosure relates to the field of memory management, and in particular, to a method and device for pre-allocating memory for forward calculation for a neural network, an electronic circuit, an electronic device, and a computer-readable storage medium.

BACKGROUND

In recent years, neural network technologies have been widely used in various fields, but for a device with very limited memory resources, there is little memory available for a neural network, which greatly limits the application and performance of the neural network in such devices.

Methods described in this section are not necessarily methods that have been previously conceived or employed. Unless otherwise indicated expressly, it should not be assumed that any of the methods described in this section are considered to be the prior art just because they are included in this section. Similarly, the problem mentioned in this section should not be considered to be universally recognized in any prior art, unless otherwise indicated expressly.

SUMMARY

According to an aspect of the present disclosure, a method for pre-allocating memory for forward calculation for a neural network is provided. The method comprises: performing the following calculation operation for each successive layer of the neural network from a first layer of the neural network: attempting, for each output from a current layer, to obtain a memory block identifier from a list of idle memory block identifiers that is used to record the idle memory block identifiers; if the memory block identifier is obtained, storing, as a mapping relationship, an identifier of the output and the obtained memory block identifier into a mapping table of outputs and memory block identifiers, and deleting the memory block identifier from the list of idle memory block identifiers, wherein the mapping table of outputs and memory block identifiers is used to record an identifier of each output from the layer and the corresponding memory block identifier; or if the memory block identifier is not obtained, creating a new memory block identifier, storing, as a mapping relationship, the identifier of the output and the new memory block identifier into the mapping table of outputs and memory block identifiers, and putting the new memory block identifier into a general list of memory block identifiers that is used to record all of the new memory block identifiers, so as to create, according to the general list of memory block identifiers during the forward calculation of the neural network, a memory block required for the forward calculation of the neural network; and for each input to the current layer, putting, into the list of idle memory block identifiers, a memory block identifier corresponding to an output from a previous layer as the input if the output from the previous layer as the input is not used as an input to a subsequent layer of the current layer.

According to another aspect of the present disclosure, a device for pre-allocating memory for forward calculation for a neural network, the device comprising: a calculation unit configured to perform the following operations: attempting, for each output from a current layer, to obtain a memory block identifier from a list of idle memory block identifiers that is used to record the idle memory block identifiers; if the memory block identifier is obtained, storing, as a mapping relationship, an identifier of the output and the obtained memory block identifier into a mapping table of outputs and memory block identifiers, and deleting the memory block identifier from the list of idle memory block identifiers, wherein the mapping table of outputs and memory block identifiers is used to record identifiers of each output from the layer and the corresponding memory block identifier; or if the memory block identifier is not obtained, creating a new memory block identifier, storing, as a mapping relationship, an identifier of the output and the new memory block identifier into the mapping table of outputs and memory block identifiers, and putting the new memory block identifier into a general list of memory block identifiers that is used to record all of the new memory block identifiers, so as to create, according to the general list of memory block identifiers during the forward calculation of the neural network, a memory block required for the forward calculation of the neural network; and for each input to the current layer, putting, into the list of idle memory block identifiers, a memory block identifier corresponding to an output from a previous layer as the input if the output from the previous layer as the input is not used as an input to a subsequent layer of the current layer.

According to another aspect of the present disclosure, an electronic circuit is provided, comprising: a circuit configured to perform the steps of the method described above.

According to another aspect of the present disclosure, an electronic device is further provided, comprising: a processor; and a memory storing a program, the program comprising instructions that, when executed by the processor, cause the processor to perform the method described above.

According to another aspect of the present disclosure, a non-transitory computer-readable storage medium storing a program is further provided, the program comprising instructions that, when executed by a processor of an electronic device, cause the electronic device to perform the method described above.

BRIEF DESCRIPTION OF THE DRAWINGS

The accompanying drawings exemplarily show embodiments and constitute a part of the specification for interpreting exemplary implementations of the embodiments, together with the description in the specification. The embodiments shown are merely for illustrative purposes and do not limit the scope of the claims. Throughout the drawings, the same reference signs refer to similar but not necessarily identical elements.

FIG. 2 shows a graphic illustration of a neural network structure;

FIG. 3 shows an example in which an output is cited a plurality of times;

FIG. 4 shows an exemplary list of idle memory block identifiers 801;

FIG. 8A and FIG. 8B show an exemplary set of inputs 804 and set of outputs 805, respectively;

FIG. 9 shows an exemplary correspondence table of outputs and the number of times of citation 806;

DETAILED DESCRIPTION

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

Neural network computing requires high memory consumption. For example, a deep neural network often involves many layers of convolution operations, starting from the input, several layers, dozens of layers, or even hundreds of layers of convolution operations need to be performed. In the prior art, memory is allocated to output of each layer in the neural network, thus a very large memory capacity is required. This is a great challenge for a device with a very limited memory capacity.

For a device with a small memory capacity, if the memory is expected to be saved, the memory may be released at the end of the calculation for each layer, and the memory may be requested according to the real-time demand when the calculation for the next layer starts, thereby improving memory utilization through real-time allocation of memory. However, requesting and allocating memory temporarily at each layer is time-consuming and greatly affects the performance of the entire neural network, especially when there are a relatively large numbers of convolution layers in the neural network.

The present disclosure provides a method for pre-allocating memory for forward calculation for a neural network.

Figure 1:
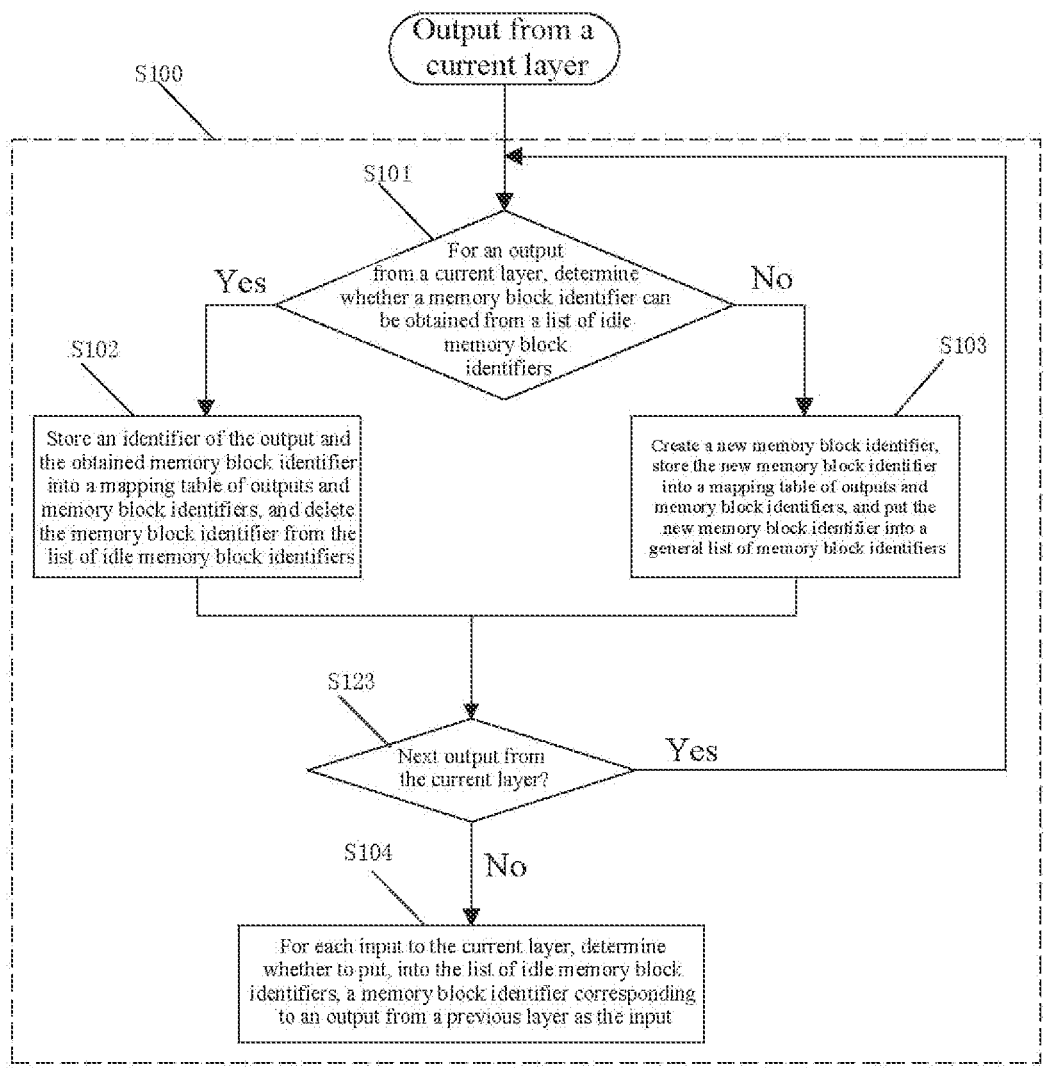
FIG. 1 is a flowchart showing a method for pre-allocating memory for forward calculation for a neural network according to an exemplary embodiment of the present disclosure.

FIG. 1 is a flowchart showing a method for pre-allocating memory for forward calculation for a neural network according to an exemplary embodiment of the present disclosure.

A neural network typically includes an input layer, and an output layer, and multiple middle layers in between. In a process of forward calculation (also referred to as forward propagation) of the neural network, input is obtained from the input layer, and then calculation is performed by each of the multiple middle layers in sequence. Results of the calculation is produced by the output layer.

In the above process of layer-by-layer calculation, required data is obtained from memory storing the output from a previous layer, to perform an operation for the current layer, and a calculation result as an output from the current layer is stored into the memory for a subsequent layer to use.

As shown in FIG. 1, the method for pre-allocating memory for forward calculation for a neural network according to an exemplary embodiment of the present disclosure comprises: performing step S100 for each successive layer of the neural network from a first layer of the neural network:

For the neural network structure shown in FIG. 2, data first enters a layer 1 for processing, then an output from the layer 1 may enter a layer 2 as an input, then an output from the layer 2 enters a layer 3 as an input, then an output from the layer 3 enters a subsequent layer as an input, and finally the data enters the last layer of the neural network.

The above "layer" herein may be one of various layers used in the neural network, for example, a convolutional layer, a pooling layer, an activation layer, or a batch normalization layer.

In addition, in order to facilitate understanding and description, FIG. 2 shows a simple input-output connection relationship, that is, an output from a previous layer is directly used as an input to a next layer. In fact, there may be a case where an output from a layer is not directly used as an input to a next layer but used as an input to another subsequent layer. Moreover, there may be a case where an output from a layer is used as inputs to a plurality of subsequent layers. In other words, there may be a case where one output is cited by several inputs. When an output is used as an input to a layer, it is deemed as "the output is cited once". When an output is used as inputs to different layers (in this case, there are a plurality of inputs), it is deemed as "the output being cited a plurality of times". FIG. 3 shows an example in which one output is cited a plurality of times. It can be seen from FIG. 3 that an output Out1 from a pooling layer 1' serves as an input In1 to a convolutional layer 2', an input In2 to a convolutional layer 3', and an input In3 to an activation layer 4', which indicates that the output Out1 from the pooling layer has been cited three times by the inputs to the subsequent layers.

The number of times that each output is cited by subsequent inputs depends on the specific structure of the neural network. In other words, the number of times that each output is cited by the subsequent inputs may be determined based on the specific structure of the neural network.

At each layer of the neural network, only one operation may be performed, for example, a complex convolution operation or an operation of an activation function or the like is performed at each layer. A plurality of operations may also be performed at one or more layers in the neural network, which is not limited in the present disclosure. An input to and an output from the operation at this layer are the input to and the output from the layer, as shown in FIG. 3.

Before the forward calculation of the neural network is performed, the calculation operation S100 may be performed at each layer for an operation of the layer. In the calculation operation S100, a memory reuse method is used. Memory to be allocated to each output and memory to be released when forward calculation is performed are calculated in advance for each output from the layer (for subsequent layers to use to implement memory reuse).

The calculation operation S100 may comprise the following steps S101-S104.

First, in step S101, for each output from the current layer, an attempt is made to obtain a memory block identifier from a list of idle memory block identifiers that is used to record an idle memory block identifier. In other words, in this step, it should be determined whether there is a memory block identifier in the list of idle memory block identifiers to be used for the output, as shown in FIG. 1.

Before the calculation operation S100 of the present disclosure is performed, the list of idle memory block identifiers may be set to be null, which means that there is no memory block identifier in the list of idle memory block identifiers at this time.

An example form of the list of idle memory block identifiers may be shown in FIG. 4. The list of idle memory block identifiers 801 comprises memory block identifiers [MID1, MID2, . . . , MIDn], that is, there are n idle memory block identifiers in total.

It should be noted that actual memory allocation is required only when it is determined that the forward calculation of the neural network is to be started. Before this, pre-allocation of memory is performed, and no actual operation is performed on the real memory space. That is, the memory space is preplanned according to the method for pre-allocating memory of the exemplary embodiment of the present disclosure, to calculate memory usage and release for each layer, but no actual memory usage and release operations are performed. During pre-allocation, the real memory space has not been created. Only when forward calculation of the neural network is to be performed, an actual memory block corresponding to the memory block identifier will be created based on the memory block identifier.

The list of idle memory block identifiers 801 herein is used to record an idle memory block identifier, that is, the list of idle memory block identifiers 801 records a memory block identifier corresponding to an idle (unused) memory block in all the created memory blocks when the forward calculation of the neural network is actually performed in the future. In other words, if a memory block identifier does not correspond to an identifier of an input or an identifier of an output, the memory block identifier may be considered as an idle memory block identifier.

According to some embodiments, a same list of idle memory block identifiers 801 may be used in the memory pre-allocation process for the forward calculation of the entire neural network. The list of idle memory block identifiers 801 stores unoccupied memory block identifiers. However, as described above, the list of idle memory block identifiers 801 may be updated at each layer, to accurately record an idle memory block identifier and implement efficient memory reuse.

The memory block identifier is used herein to represent a memory block during the forward calculation of the neural network in the future. In this way, real-time calculation for the allocation and release of memory during the forward calculation is not required, and a memory block corresponding to each input and a memory block corresponding to each output during the forward calculation can be clearly distinguished. For example, an "idle" memory block identifier may represent an "idle" memory block during the actual forward calculation, and a "used" memory block identifier may represent an "occupied" (or "used") memory block during the actual forward calculation.

In the present disclosure, each memory block identifier may correspond to a memory block, which has a specific capacity.

According to some embodiments, in step S101 shown in FIG. 1, if a memory block capacity corresponding to the memory block identifier obtained from the list of idle memory block identifiers is less than a capacity required by the output, the memory block capacity corresponding to the memory block identifier may be expanded, so that the memory block capacity meets the capacity requirement of the output.

According to some embodiments, in step S101 shown in FIG. 1, the obtaining a memory block identifier from a list of idle memory block identifiers that is used to record an idle memory block identifier may comprise: if there are a plurality of idle memory block identifiers in the list of idle memory block identifiers, and the memory block capacities corresponding to the plurality of idle memory block identifiers are all less than the capacity required by the output (that is, there is no memory block identifier whose capacity is equal to or greater than the capacity required by the output), selecting, as a memory block identifier having a mapping relationship with the output, a corresponding idle memory block identifier with the largest memory block capacity from the plurality of idle memory block identifiers.

It should be noted that although the idle memory block identifier with the largest capacity is selected from the plurality of idle memory block identifiers, the largest capacity is still less than the capacity required by the output. Therefore, according to some embodiments, as described above, the memory block capacity corresponding to the selected memory block identifier may be expanded, so that the memory block capacity can be at least equal to the capacity required by the output.

According to some embodiments, the expanding the memory block capacity corresponding to the memory block identifier may comprise: expanding, according to the capacity required by the output, the memory block capacity corresponding to the memory block identifier, so that the memory block capacity is at least equal to the capacity required by the output.

A case in which the memory block capacity corresponding to the memory block identifier in the list of idle memory block identifiers is less than the capacity required by the output and measures taken are described in the above. A case in which the memory block capacity is equal to or greater than the capacity required by the output and measures taken are to be described below.

According to some embodiments, in step S101 shown in FIG. 1, the obtaining a memory block identifier from a list of idle memory block identifiers that is used to record an idle memory block identifier may further comprise: if there are a plurality of idle memory block identifiers in the list of idle memory block identifiers, comparing a memory block capacity corresponding to each of the plurality of idle memory block identifiers with the capacity required by the output, and selecting, in the memory block capacities greater than or equal to the capacity required by the output, an idle memory block identifier corresponding to a memory block capacity that has the smallest difference from the capacity required by the output as a memory block identifier having a mapping relationship with the output.

In other words, for one output described above, if a plurality of idle memory block identifiers in the list of idle memory block identifiers may be selected as a corresponding memory block identifier of the output, memory block identifiers whose capacity is greater than or equal to the capacity required by the output may be selected from the plurality of idle memory block identifiers, and then a memory block identifier whose capacity is closest to the capacity required by the output is selected from the memory block identifiers whose capacity is greater than or equal to the capacity required by the output.

For example, for an output OUT1, it is assumed that, three memory block identifiers ID2, and ID3 in the list of idle memory block identifiers 801 may be selected, capacities of these three memory block identifiers are 1K bytes, 5K bytes, 8K bytes, respectively, and a capacity required by the output OUT1 is 4K bytes. In this case, it may be determined that the capacities of the memory block identifiers ID2 and ID3 are both greater than that required by the output OUT1, and then, the memory block identifier ID2 whose capacity is closer to the capacity of 4K bytes required by the output OUT1 is selected from ID2 and ID3 as a memory block identifier corresponding to the output OUT1.

According to some embodiments, the capacity required by the output may be determined based on a data size and a data type of the output.

During the calculation for each layer of the neural network, a data size and a data type of each output at the layer may be determined. For example, a data type of an output from a convolutional layer is a floating-point type. Assuming that a piece of floating-point data occupies 4 bytes, and a data size of the output is 200*200*5, then memory space (that is, the capacity required by the output) required by the output is 200*200*5*4=800,000 bytes.

A case where there is at least one memory block identifier in the list of idle memory block identifiers for the output to select and use is described above. Even if there is at least one memory block identifier in the list of idle memory block identifiers, only one corresponding memory block identifier can be selected for one output.

If the memory block identifier is obtained from the list of idle memory block identifiers in step S101, in step S102, an identifier of the output and the obtained memory block identifier are stored, as a mapping relationship, into "a mapping table of outputs and memory block identifiers" that is used to record each output from the layer and the corresponding memory block identifier, and the memory block identifier is deleted from the list of idle memory block identifiers.

Figures 5, 6, 7:
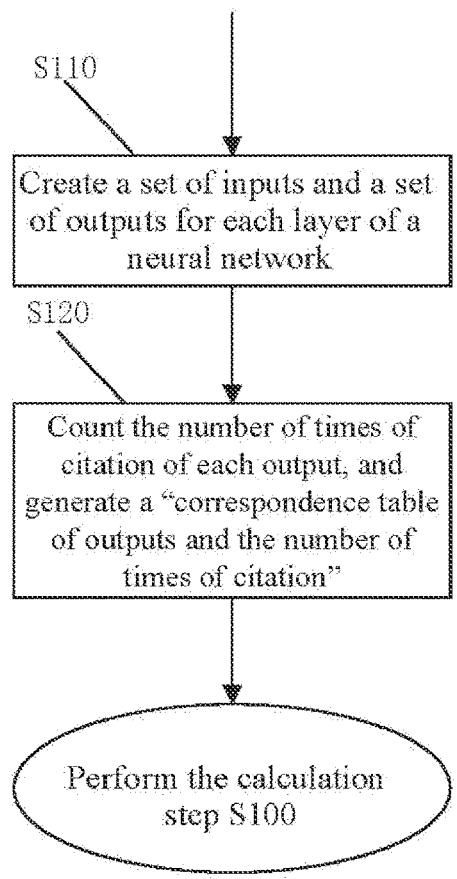
FIG. 5 shows an exemplary mapping table of outputs and memory block identifiers 802.
FIG. 6 shows an exemplary general list of memory block identifiers 803.
FIG. 7 shows a procedure of operation performed before a calculation operation S100 according to an exemplary embodiment of the present disclosure.

The foregoing "mapping table of outputs and memory block identifiers 802" records a memory block identifier to be used for each output from a layer during the actual forward calculation of the neural network. Therefore, in the list, in addition to the memory block identifier (MID) to be used, each output's identifier (OID) should also be recorded, so as to establish a one-to-one correspondence (as shown in FIG. 5) between each output from the layer and the corresponding memory block identifier. The one-to-one correspondence herein is referred to as a "mapping relationship". In this specification, there is not only the mapping relationship between the output identifier OID and the corresponding memory block identifier MID, but also the mapping relationship between the output identifier OID and the number of times of citation of the output identifier. Through such mapping relationships, an association between the output identifier and the memory block identifier, as well as that between the output identifier and the number of times of citation are established, so that memory usage and memory release during actual running can be determined during pre-calculation.

If the memory block identifier is obtained from the list of idle memory block identifiers in step S101, it indicates that there is an idle memory block at the layer and an idle memory block identifier has been obtained. In this case, step S102 may be performed to store, as a mapping relationship, the identifier of the output and the obtained memory block identifier, into the "table of outputs and memory block identifiers 802" to indicate that, during the actual performing of forward calculation of the neural network, the output is to use the memory block corresponding to the memory block identifier at this layer, that is, the output will occupy the memory block at this layer (that is, the memory block identifier will be occupied).

Since the memory block identifier will be occupied at the layer, that is, the memory block identifier will no longer be idle, the memory block identifier may be deleted from the list of idle memory block identifiers 801 to reflect whether the memory block identifier is idle timely.

In step S102, a case where there is a memory block identifier in the list of idle memory block identifiers is described. On the contrary, if there is no memory block identifier in the list of idle memory block identifiers, a new memory block identifier needs to be created, so that during the forward calculation of the neural network in the future, there is a memory block that can store the output.

Therefore, if the memory block identifier is not obtained from the list of idle memory block identifiers in step S101, it indicates that there is no idle memory block identifier. Step S103 may be performed to create a new memory block identifier, and store, as a mapping relationship, an identifier of the output and the new memory block identifier into the "mapping table of outputs and memory block identifiers 802".

As mentioned above, the "mapping table of outputs and memory block identifiers 802" for each layer stores a one-to-one correspondence between an identifier of each output at the layer and a corresponding memory block identifier. Regardless of whether the memory block identifier is obtained from the list of idle memory block identifier or is newly created, the one-to-one correspondence between the identifier of each output and the corresponding memory block identifier means that the output will occupy the memory block corresponding to the memory block identifier at the layer. Therefore, memory is allocated in advance for each output from each layer, and during the actual forward calculation of the neural network, it is unnecessary to temporarily request memory allocation and then temporarily calculate and deploy how to allocate the memory, thereby avoiding spending time in request and allocation of memory during the forward calculation of the neural network, and accelerating the calculation.

In addition, the new memory block identifier may further be put into a general list of memory block identifiers that is used to record all of the new memory block identifiers, so as to create, according to the general list of memory block identifiers during the forward calculation of the neural network, a memory block required for the forward calculation of the neural network.

As shown in FIG. 6, the "general list 803 of memory block identifiers" is used to record memory block identifiers MID of memory blocks used during the forward calculation of the entire neural network, that is, the new memory block identifiers are to be put into the list after being created, so as not to miss each memory block to be used in the forward calculation process of the neural network.

After step S102 or S103, in step S123, it may be determined whether there is a next output from the current layer. If yes, step S101 is performed to repeat the determining until step S101 is performed for each output from the current layer, and step S102 or S103 is performed after step S101. If it is determined that there is no next output from the current layer, that is, the determining in step S101 has been performed for all outputs from the current layer, then step S104 is performed.

In step S104, for each input to the current layer, a memory block identifier corresponding to the output from the previous layer as the input is put into the list of idle memory block identifiers if an output from a previous layer as the input is not used as an input to a subsequent layer of the current layer.

As described above, if one output is used as the input to the subsequent layer, it indicates that the output is cited by the input to the subsequent layer. In this step, it is determined whether the output from the previous layer corresponding to each input to the current layer is cited by inputs to other layers after the current layer, that is, whether the number of times of citation of the output from the previous layer as the input to the current layer are equal to 1 (only cited by the input to the current layer). If the output from the previous layer corresponding to each input to the current layer is not cited by inputs to other layers after the current layer, that is, the number of times of citation of the output from the previous layer as the input to the current layer are equal to 1, it indicates that the memory block identifier occupied by the output as an input to the current layer will become idle and may be put into the list of idle memory block identifiers.

It can be clearly learned from this step how to determine the memory block identifier to be stored in the list of idle memory block identifiers. The memory block identifier to be obtained from the list of idle memory block identifiers in step S101 is stored into the list of idle memory block identifiers in this manner.

Through step S104, the memory block identifier in the list of idle memory block identifier of each layer may be updated, and more specifically, the new idle memory block identifier of the layer may be determined, so that it can be determined whether the memory block identifier of each layer is idle. According to the idle status of the memory block identifier of each layer, memory reuse may be performed during the forward calculation of the neural network (in steps S101 and S102, if it is determined that there is an idle memory block identifier, the idle memory block identifier may be directly used, thereby implementing memory reuse during the actual forward calculation of the neural network), thereby greatly saving memory usage and improving memory utilization.

According to the present disclosure, the memory is pre-allocated by using a memory reuse mode for the forward calculation of the neural network, so that the memory size used in the forward calculation process of the entire neural network is reduced. Moreover, since the memory has been allocated in advance, the memory to be used for the forward calculation of the entire neural network can be first created before the forward calculation of the neural network starts, so that the allocation and release of the memory can be completely prevented from being calculated frequently in the forward calculation process of the neural network, thereby greatly saving the time for the forward calculation of the neural network and improving efficiency of the forward calculation.

According to the present disclosure, the memory to be used in each layer is pre-allocated before the forward calculation of the neural network starts, so that temporary requesting and allocation of memory in the forward calculation process of the neural network can be avoided, which greatly shortens the calculation processing time and accelerates the forward calculation process of the neural network, thereby effectively improving performance of the entire neural network. In addition, when the memory is pre-allocated, the memory reuse is further used to reduce the memory capacity used, so as to maximize the use and save very limited memory resources on an embedded device.

According to some embodiments, as shown in FIG. 7, the method for pre-allocating memory for forward calculation for a neural network according to an exemplary embodiment of the present disclosure may further comprise: before the calculation operation S100, performing step S110, to construct a set of inputs and a set of outputs of the layer for each layer of the neural network.

As shown in FIG. 8A, each element in the set of inputs 804 constructed for each layer of the neural network comprises an identifier IID of each input to the layer, a data size Data-In, and a memory block pointer In-Pointer pointing to a memory block address for storing the input. The set of inputs illustrated in FIG. 8A has k elements, wherein k is greater than or equal to 1.

Similarly, as shown in FIG. 8B, each element in the set of outputs 805 constructed for each layer of the neural network comprises an identifier OID of each output from the layer, a data size Data-Out, and a memory block pointer Out-Pointer pointing to a memory block address for storing the output. The set of outputs illustrated in FIG. 8B has m elements, wherein m is greater than or equal to 1.

In this way, by constructing a corresponding set of inputs 804 for each layer, input-related input identifiers, data sizes, and memory block pointers (the memory block pointers are all null before the forward calculation of the neural network starts) of one layer are stored together into a set of inputs, which is convenient for centralized management and flexible access to the data. Similarly, by constructing a corresponding set of outputs 805 for each layer in this way, output-related output identifiers, data sizes, and memory block pointers (the memory block pointers are all null before the forward calculation of the neural network starts) of one layer are stored together into a set of outputs, which is also convenient for centralized management and flexible access to the data. As a result, the calculation process of memory pre-allocation can be simplified. A specific example will be given later for further detailed description, so as to understand the content of the present disclosure more easily.

According to some embodiments, as shown in FIG. 7, the method for pre-allocating memory for forward calculation for a neural network according to an exemplary embodiment of the present disclosure may further comprise: before the calculation operation S100, performing step S120 to count, as the number of times of citation of the output, the number of times for which each output in the neural network is used as an input to a subsequent layer of the output, and generating a correspondence table (as shown in FIG. 9) of outputs and the number of times of citation that is used to record a mapping relationship between each output and the number of times of citation of the output.

According to some embodiments, it may be determined, by using the number of times of citation of an output recorded in the correspondence table (updated layer by layer) of outputs and the number of times of citation 806, whether the memory block identifier corresponding to the output is to become an idle memory block identifier.

Figure 10:
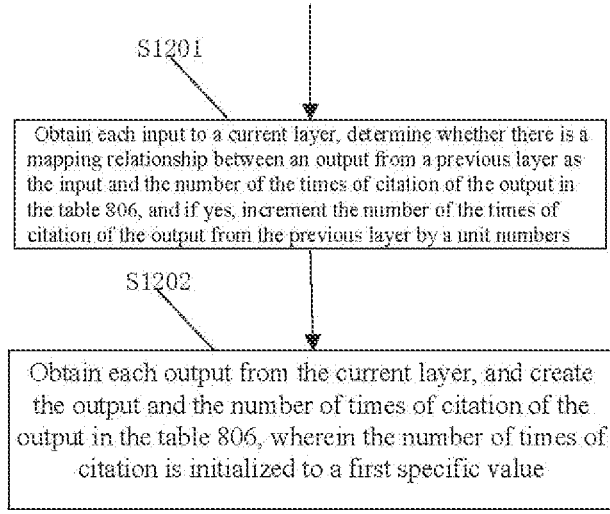
FIG. 10 is a flowchart of a method for generating the correspondence table of outputs and the number of times of citation 806 according to an exemplary embodiment of the present disclosure.

According to some embodiments, as shown in FIG. 10, the step S120 of counting, as the number of times of citation of the output, the number of times for which each output in the neural network is used as an input to a subsequent layer of the output, and generating a correspondence table of outputs and the number of times of citation that is used to record a mapping relationship between each output and the number of times of citation of the output comprises the following steps.

For each layer of the neural network, in step S1201, each input to the current layer is obtained, it is determined whether there is a mapping relationship between an output from a previous layer as the input and the number of times of citation of the output in the correspondence table of outputs and the number of times of citation 806, and if yes (indicating that the output from the previous layer as the input has been cited before the current layer), the number of times of citation of the output from the previous layer is incremented by a unit number; if no, it indicates that the input does not correspond to the output from the previous layer, that is, the input is not transmitted from the output from the previous layer, and there is no related operation of the output and the number of times of citation of the output; and in step S1202, each output from the current layer is obtained, and the output and the number of times of citation of the output are created as a mapping relationship in the correspondence table of outputs and the number of times of citation 806, wherein the number of times of citation having a mapping relationship with the output is initialized to a first specific value.

The unit number herein may be 1, and the first feature value may be 0.

For example, the output from the current layer has not been cited by any one input in the layer, and then the number of times of citation of the output may be initialized to 0. If the output is cited by an input at a subsequent layer, the number of times of citation of the output at the subsequent layer is increased by 1, that is, the number of times of citation becomes 1.

In this case, if there is a mapping relationship between the output from the previous layer as an input to a layer and the number of times of citation of the output in the correspondence table of outputs and the number of times of citation 806, it indicates that the input is transferred from the output. In this case, the number of times of citation of the output is increased by 1 to indicate that the input at the layer cites the output. If there is no mapping relationship, it indicates that the input is not transferred from the output, and therefore related operations of the output and the number of times of citation of the output may not be involved.

Figure 11:
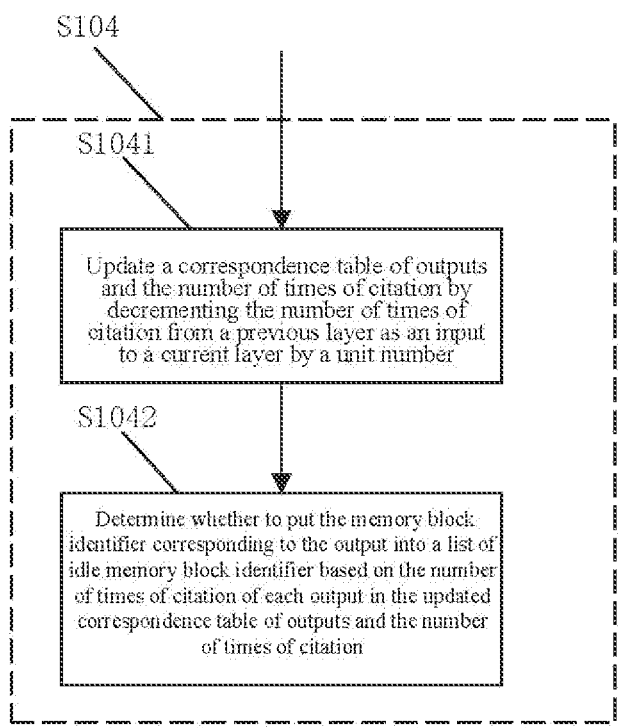
FIG. 11 is a flowchart of a method for updating the correspondence table of outputs and the number of times of citation 806 according to an exemplary embodiment of the present disclosure.

According to some embodiments, as shown in FIG. 11, the performing the calculation operation S100 for each layer of the neural network may further comprise step S1041: updating a correspondence table of outputs and the number of times of citation by decrementing the number of times of citation of an output from a previous layer as an input to a current layer by the unit number; and step S1042: determining, based on the number of times of citation of each output in the updated correspondence table of outputs and the number of times of citation, whether to put, into a list of idle memory block identifiers, a memory block identifier corresponding to the output, thereby obtaining memory reuse during the actual forward calculation of the neural network.

As described above, the unit number may be 1, that is, every time an output is cited once by an input, the number of times of citation of the output is increased by 1. On the contrary, in the process of calculating memory allocation layer by layer, each time calculation is performed for a layer, an input to the layer may cite the output from the previous layer (not necessarily the layer immediately before). Therefore, when calculation is performed for the layer, the number of times of citation of the output from the previous layer as the input should be reduced by 1.

According to some embodiments, in step S104, the putting, into the list of idle memory block identifiers, a memory block identifier corresponding to the output from the previous layer as the input if the output from the previous layer as the input is not used as the input to the subsequent layer of the current layer (that is, the number of times of citation of the output is 1 in this case, and the output is still cited by the input and therefore is 1) comprises: if the number of times of citation of the output from the previous layer become a second specific value after the unit number is subtracted, putting, into the list of idle memory block identifiers, the memory block identifier corresponding to the output from the previous layer.

The operation may be considered as a specific operation of step S1042. For example, if the number of times of citation of the output from the previous layer becomes 0 (as an example of the second specific value) after 1 is subtracted (as an example of the unit number), it indicates that the memory block identifier corresponding to the output may become an idle memory block identifier, and the memory block identifier corresponding to the output is put into the list of idle memory block identifiers.

Therefore, based on a status of the input to and output from each layer of the neural network, the memory block identifier corresponding to each output from each layer is calculated in advance (one memory block identifier will correspond to a real memory block when forward calculation of the neural network is performed). Therefore, the time of requesting memory in real time, calculating memory allocation in real time, allocating memory in real time, calculating memory release in real time, and releasing memory in real time at each layer when the forward calculation of the neural network is performed is greatly saved; the processing speed is accelerated; and the memory block identifier recorded in the list of idle memory block identifiers is updated, so as to implement memory reuse and make efficient use of valuable memory resources in a device.

According to some embodiments, the obtained or created memory block identifier and the corresponding memory block capacity are stored, as a mapping relationship, into a mapping table of used memory block identifiers and capacities that is used to record the memory block identifier used in the current layer and the corresponding memory block capacity, and the content block capacity of the corresponding memory block identifier is updated in the mapping table of used memory block identifiers and capacities in response to the expansion of the memory block capacity.

Figures 12, 13:
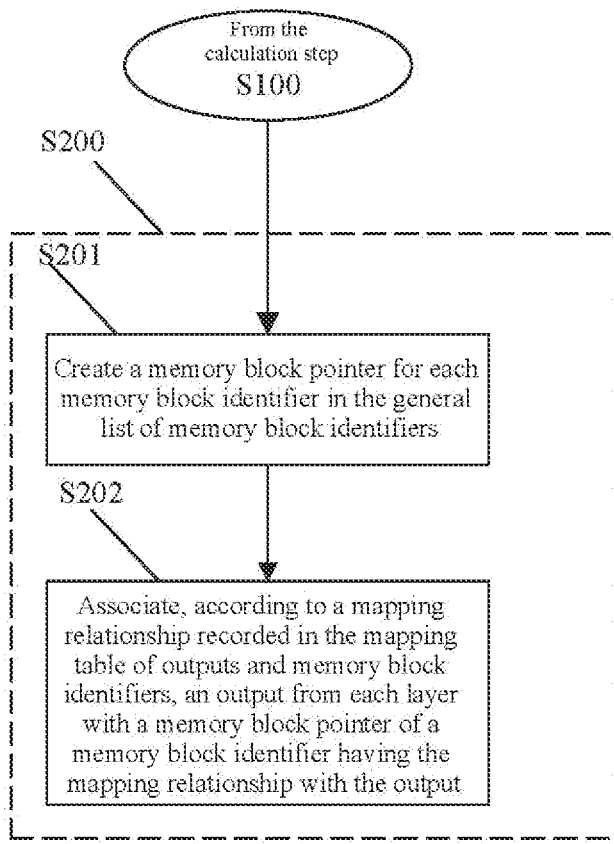
FIG. 12 shows an exemplary mapping table of used memory block identifiers and capacities 807.
FIG. 13 is a flowchart of a memory allocation step S200 according to an exemplary embodiment of the present disclosure.

The mapping table 807 of used memory block identifiers and capacities may also be referred to as a memory block descriptor used to record the memory block identifier, a memory block capacity, and the like, so as to establish an association between the memory block identifier and a memory block capacity corresponding to the memory block identifier, as shown in FIG. 12. The memory capacity corresponding to the aforementioned memory block identifier may be obtained from the table. In addition, the table 807 may further comprise a type (a "data type" field shown in FIG. 12) of data stored in the memory block corresponding to the memory block identifier.

In the case of expanding the memory block capacity described above, the content block capacity of the corresponding memory block identifier may be updated in the mapping table of used memory block identifiers and capacities 807, so that the preplanned memory block capacity corresponding to the memory block identifier can meet the requirement for sufficient data storage.

According to some embodiments, the mapping relationship between identifiers of all outputs of the neural network and corresponding memory block identifiers is stored in the mapping table of outputs and memory block identifiers 802.

The mapping relationship between identifiers of all outputs of the neural network and corresponding memory block identifiers is stored in the mapping table of outputs and memory block identifiers 802, which is used to record the memory blocks occupied by the outputs of each layer, and it is easy to directly allocate, to each output, the memory block corresponding to the pre-calculated memory block identifier during the forward calculation of the neural network. There may be a mapping table of outputs and memory block identifiers 802 at each layer herein, or the table 802 may be a general list obtained for all layers of the entire neural network.

According to some embodiments, the method for pre-allocating memory for forward calculation for a neural network according to the present disclosure may further comprise a memory allocation step S200 after the calculation operation S100.

As shown in FIG. 13, the memory allocation step S200 may comprise the following steps S201 and S202.

In step S201, a memory block pointer is created for each memory block identifier in a general list of memory block identifiers.

As described above, the memory block identifiers created for each layer of the neural network are recorded in the general list of memory block identifiers 803, and therefore memory blocks corresponding to the memory block identifiers appearing in the list will be used in the forward calculation of the neural network. Therefore, as a preparation for starting to perform the forward calculation of the neural network, the required memory may be allocated first. The memory required for forward calculation of the neural network may be created according to the general list of memory block identifiers 803. For example, a memory block is created correspondingly for a memory block identifier, and the capacity of the created memory block may be determined according to a memory block descriptor related to the memory block identifier.

In the present disclosure, by creating a memory block pointer for the memory block identifier, the memory block pointer points to a real memory block, and the real memory block is created for the memory block identifier in a one-to-one correspondence.

In step S202, an output from each layer is associated, according to the mapping relationship recorded in the mapping table of outputs and memory block identifiers, with a memory block pointer of a memory block identifier having the mapping relationship with the output.

As described above, the mapping table of outputs and memory block identifiers records the mapping relationship between each output and memory block identifiers. Therefore, by associating an output from the current layer with the memory block pointer of the memory block identifier having a mapping relationship with the output, memory is allocated to the output from the current layer, thereby implementing real memory allocation. In other words, the real memory allocation in step S200 is implemented according to the memory pre-allocation in step S100.

In this step, by referring to the mapping table of outputs and memory block identifiers 802 at each layer, a memory allocation result of the output from the layer can be obtained, and there is no need to request, calculate, and allocate memory for each layer again, thereby saving the time of real-time request and memory allocation and accelerating the speed of the forward calculation of the neural network.

The following will briefly illustrate how to implement the method for pre-allocating memory for forward calculation for a neural network according to an exemplary embodiment of the present disclosure. It should be noted that in this example, each detailed step or operation described above may not be involved, but a person skilled in the art should understand, in combination with the content described herein and context, how to implement those steps or operations that are not described.

For example, operations for each layer in a neural network may be abstracted into an operation class through Tensor-Flow (a symbolic mathematical system based on data flow programming). Each operation class may comprise the above set of inputs 804 and set of outputs 805, and each input and each output in the set of inputs 804 and set of outputs 805 can be abstracted into a tensor class. The tensor class comprises an identifier of a tensor (for example, a name of the tensor), a shape of the tensor, and an address pointer of the tensor.

TensorFlow uses the tensor to represent data. The tensor is a data structure and may be considered as n-dimensional data. The tensor has three properties: a dimension, a shape (representing the number of elements in the $i^{th}$ dimension, i=1, 2, . . . , n), and a data type.

The identifier of the tensor may be the name of the tensor, for example. The shape of a tensor is used to represent the number of elements in the $i^{th}$ dimension, and a capacity of the element may be easily obtained through the shape of the tensor. The address pointer of the tensor is used to point to a memory address used by the tensor, that is, the "memory block pointer" described above.

For the neural network, an operation is performed at one layer, such as a convolution operation, a pooling operation, and the like.

An operation at each layer may be represented by, for example, the operation classes shown below.

```
Class operation{
    Vector inputs; [Tensor1, Tensor2,...] /*set of inputs and elements in a
    tensor form*/
    Vector outputs; [Tenser1, Tensor2,...] /*set of outputs and elements
    in a tensor form*/
}
```

For the tensor class that may be used to represent the input and output described above, the following example form is given.

```
Class Tensor {
    String name:"layer1-conv" /*identifier of tensor*/
    Shape:    [300,300, 3]/*shape of tensor*/
    Pointer:  null  /*address pointer of the tensor, null during memory pre-
allocation*/
    Datatype:  int  /*data type of tensor, optional data types comprise int, short, float,
and the like*/
    }
```

From the shape [300, 300, 3] of the tensor and the data type int defined in the tensor class (assuming that each int type data can occupy 4 bytes of memory), the data size of the tensor (an input or output) may be obtained as follows: 300*300*3*4=1,080,000 bytes.

The address pointer (the memory block pointer) of the tensor is no longer null after memory allocation is performed in step S220, but will point to an address of the corresponding memory block. An example will be given as follows.

```
Class Pointer{
    Size: 300*300*3*4 /*data size of the tensor obtained from the shape
    of the tensor*/
    Address: 0x80000000/*address pointed by the address pointer of the
    tensor*/
}
```

The implementation examples of the tensor that may be used as an input and an output and an address pointer that may be used as the tensor of the memory block pointer are given above.

For the memory pre-allocation task of the forward calculation for a neural network, a neural network structure may be first analyzed to determine a relationship between each operation node and each operation node comprised in the structure, and then a one-dimensional list of operation vectors may be constructed, for example [operation1, operation2, . . . ]. The list of vectors may store all the operations of the neural network and the execution order of these operations. Through each operation vector (operation class) in the list of vectors, a set of inputs and a set of inputs in each operation class are obtained.

For the above lists 801-807, the input identifier and the output identifier may be the identifiers of the tensor illustrated above, and a data size of an input or output may be the data size of the tensor of the input or output determined by using the method illustrated above.

The process of allocating memory for forward calculation for a neural network based on the method for pre-allocating memory according to an exemplary embodiment of the present disclosure will be described below by using an example. It should be noted that the specific steps and sequence shown below are only an exemplary implementation for ease of understanding, and the present disclosure should not be limited by the exemplary implementation, but should be subject, based on the entire description, to the scope defined by the claims.

Specifically, steps of the example are as follows.

Step 1): Based on the above list of operation vectors, for example, the number of times of citation of the output may be counted successively for each operation in the list of operation vectors.

As described above, the correspondence table of outputs and the number of times of citation 806 may be used to record and update the mapping relationship between the output and the number of times of citation.

As described above, through each operation vector (operation class) in the list of operation vectors, a set of inputs and a set of outputs in each operation class may be obtained. Therefore, based on the operation itself (inputs and outputs) and the relationship between the operations (such as the order of operations), the mapping relationship between the output and the number of times of citation may be obtained, and therefore the correspondence table of outputs and the number of times of citation 806 may be obtained.

Step 2): Based on the above list of operation vectors, for each operation therein, an output tensor in the set of outputs of the operation is obtained, and for each output tensor, the following operations for mapping a memory block identifier for each output tensor in the operation (that is, the layer) are performed.

i. An attempt is made to obtain a memory block identifier from the above list of idle memory block identifiers 801; and
  ii. If a memory block identifier is obtained for the output tensor from the list of idle memory block identifiers 801, the mapping table (a memory block descriptor) of used memory block identifiers and capacities 807 is searched based on the memory block identifier, and a data size of the output tensor (the data capacity required for the output) is compared with the memory block capacity recorded in the mapping table of used memory block identifiers and capacities memory block descriptor 807. It should be noted herein that the mapping table (the memory block descriptor) of used memory block identifiers and capacities 807 records the memory block identifier and the capacity of a memory block corresponding to the memory block identifier, which may be initialized to be null. In addition, after a new memory block identifier is created for an output tensor, the memory block capacity corresponding to the memory block identifier recorded in the list is the data size of the output. Moreover, as described above, with the pre-calculation layer by layer, the memory block capacity corresponding to the memory block identifier may vary with the corresponding output. More specifically, if the data size of a certain output corresponding to the memory block identifier in the following is greater than a data size of an output corresponding to the previous one, the memory block capacity corresponding to the memory block identifier may also become larger accordingly, which are to be described below.
  iii. When the corresponding memory block capacity recorded in the memory block descriptor 807 is less than the data size of the output tensor, the memory block capacity may be updated based on the data size of the output tensor, so that the memory block capacity is at least equal to the data size of the output tensor. Then, the memory block identifier may be removed from the list of idle memory block identifiers, and the identifier of the output tensor and the memory block identifier are stored, as a mapping relationship, into the mapping table of outputs and memory block identifiers

802, to indicate that the output tensor will occupy the memory block corresponding to the memory block identifier when the operation is performed in the future.

iv. If no memory block identifier is obtained for the output tensor from the above list of idle memory block identifiers 801, a new memory block identifier may be created and stored into a general list of memory block identifiers 803, and the identifier of the output tensor and the new memory block identifier are stored, as a mapping relationship, into the mapping table of outputs and memory block identifiers 802, to indicate that the output tensor will occupy the memory block corresponding to the memory block identifier when the operation is performed in the future. As described above, the list 803 stores all of the new memory block identifiers, that is, all memory block identifiers to be used during forward calculation of the neural network.

v. It is determined whether the above operations have been performed for each output tensor in the operation, if yes, step i) is performed to continue the operation, and if no, step 3) is performed below.

Step 3): Based on the above list of operation vectors, for each operation therein, an input tensor in the set of inputs of the operation is obtained, and for the input tensor in the set of inputs of the operation, the following operations of updating the list of idle memory block identifiers 801 based on the citation relationship between the input tensor and the output tensor are performed.

i. For each input tensor, the correspondence table of outputs and the number of times of citation 806 is searched for a mapping relationship between an identifier (which is actually the identifier of the output tensor of the previous layer cited by the input tensor, if the input tensor is transferred from the output tensor of the previous layer) of the input tensor and the number of times of citation.

ii. If the mapping relationship is found in the table 806, the number of times of citation in the mapping relationship are reduced by 1, for example, so as to subtract the citation (the number of times of citation of this layer is 1) of the output by the input to this layer first. If the number of times of citation become 0 after subtracting 1, it indicates that the output tensor of the previous layer is not cited again subsequently, and the memory block identifier corresponding to the output tensor may become idle. Therefore, the memory block identifier may be put into the list of idle memory block identifiers, thereby implementing memory reuse during the forward calculation of the neural network.

iii. If no such mapping relationship is found, it indicates that the input tensor does not cite any output tensor, and then the following step iv may be performed.

iv. It is determined whether there is any input tensor in the operation, if yes, the above step i is performed, and if no, the following step 4 is performed.

Through steps 1-3 illustrated above, the method for pre-allocating memory for forward calculation for a neural network according to an exemplary embodiment of the present disclosure may be implemented. As mentioned above, by using the method, the forward calculation of the neural network may be accelerated, and the memory utilization may be improved.

The following step 4) will give an example of the memory allocation operation before the forward calculation of the neural network is performed.

Step 4): For each memory block identifier in the mapping table of outputs and memory block identifiers 802, a memory block pointer (an address pointer of a tensor) corresponding to the memory block identifier is created, and then each output is associated, according to the mapping relationship between each output from each layer (each operation) and the memory block identifier recorded in the mapping table of outputs and memory block identifiers 802, with the memory block pointer (the address pointer of the tensor) of the memory block identifier having a mapping relationship with the output. In this way, the memory can be allocated in the initialization process of the forward calculation of the neural network, and the allocated memory can be used directly in the forward calculation process of the neural network, thereby greatly accelerating the forward calculation of the neural network.

An exemplary implementation of the present disclosure is described above by using TensorFlow as an example. It should be noted that the present disclosure is not limited to the method for implementation, no matter which method, as long as the essence of the present disclosure can be implemented.

Figure 14:
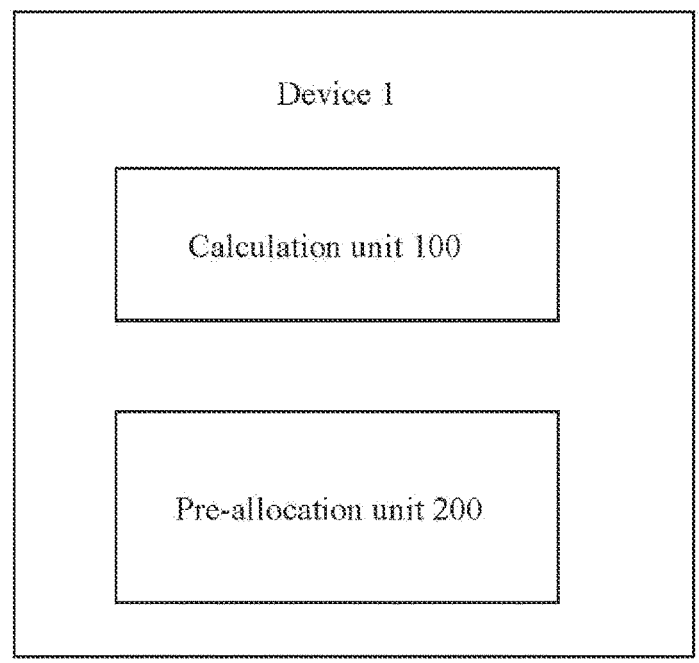
FIG. 14 is a schematic block diagram of a memory pre-allocation device 1 according to an exemplary embodiment of the present disclosure.

According to some embodiments, as shown in FIG. 14, the present disclosure provides a device 1 (which may also be referred to as a memory pre-allocation device 1) for pre-allocating memory for forward calculation for a neural network, which may comprise: a calculation unit 100 and a pre-allocation unit 200.

The calculation unit 100 may be configured to perform, from a first layer of the neural network, the following operations for each layer of the neural network arranged in sequence:

attempting, for each output from a current layer, to obtain a memory block identifier from a list of idle memory block identifiers that is used to record an idle memory block identifier;

if the memory block identifier is obtained, storing, as a mapping relationship, an identifier of the output and the obtained memory block identifier into "a mapping table of outputs and memory block identifiers" that is used to record an identifier of each output from the layer and the corresponding memory block identifier, and the memory block identifier is deleted from the list of idle memory block identifiers; or if the memory block identifier is not obtained, creating a new memory block identifier, storing, as a mapping relationship, an identifier of the output and the new memory block identifier into a mapping table of outputs and memory block identifiers, and putting the new memory block identifier into a general list of memory block identifiers that is used to record all of the new memory block identifiers, so as to create, according to the general list of memory block identifiers during the forward calculation of the neural network, a memory block required for the forward calculation of the neural network; and or each input to the current layer, putting, into the list of idle memory block identifiers, a memory block identifier corresponding to an output from a previous layer as the input if the output from the previous layer as the input is not used as an input to a subsequent layer of the current layer.

The operation of the computing unit 100 is similar to the operation of step S100 described above, and details are not described herein again for brevity.

According to some embodiments, as shown in FIG. 14, the memory pre-allocation device 1 may further comprise a pre-allocation unit 200.

The pre-allocation unit 200 may be configured to: create a memory block pointer for each memory block identifier in the general list of memory block identifiers; and associate, according to the mapping relationship recorded in the mapping table of outputs and memory block identifiers, an output from each layer with the memory block pointer of the memory block identifier having the mapping relationship with the output.

The operation of the pre-allocation unit 200 is similar to the operation of step S200 described above, and details are not described herein again for brevity.

As mentioned above, by using the memory pre-allocation device 1 according to the present disclosure, the forward calculation of the neural network may be accelerated, and the memory utilization may be improved.

According to another aspect of the present disclosure, an electronic circuit 2100 is further provided, which may comprise: a circuit configured to perform the operation of the method described above. According to another aspect of the present disclosure, an electronic device 2000 is further provided, comprising: a processor; and a memory storing a program, the program comprising instructions that, when executed by the processor, cause the processor to perform the method described above. According to another aspect of the present disclosure, a non-transitory computer-readable storage medium storing a program is further provided, the program comprising instructions that, when executed by a processor of an electronic device, cause the electronic device to perform the method described above.

Figure 15:
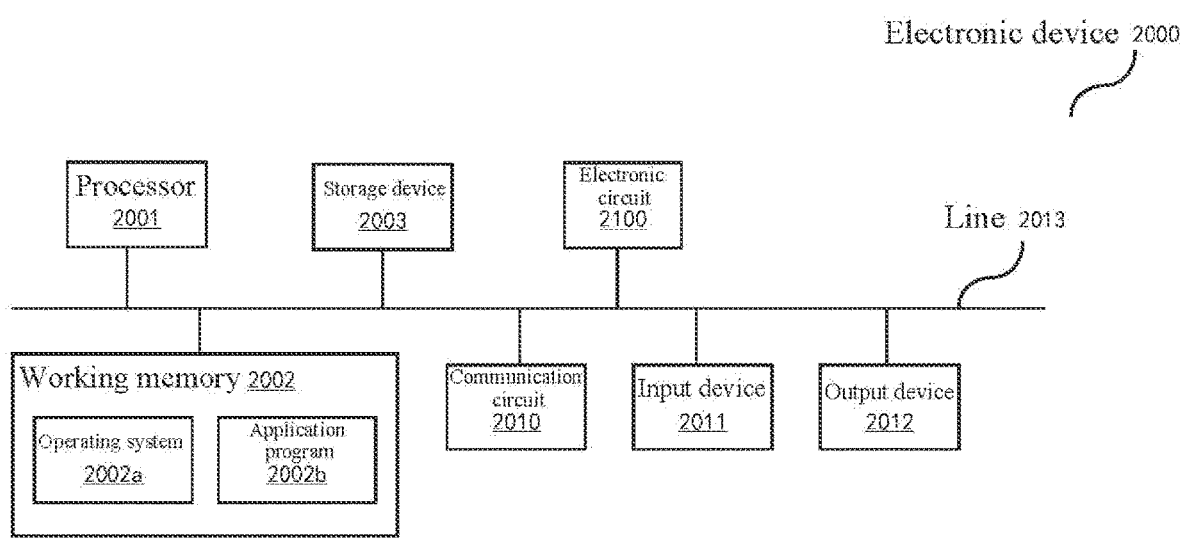
FIG. 15 is a structural block diagram showing an electronic device according to an exemplary embodiment of the present disclosure.

FIG. 15 is a block diagram showing an example of an electronic device according to an exemplary embodiment of the present disclosure. It should be noted that the structure shown in FIG. 15 is merely an example, and according to a specific implementation, the electronic device in the present disclosure may comprise only one or more of constituent parts shown in FIG. 15.

The electronic device 2000 may be, for example, a general-purpose computer (for example, various computers such as a laptop computer and a tablet computer), a mobile phone, a personal digital assistant, and various smart devices.

According to some implementations, the electronic device 2000 may comprise a communication circuit 2010. The communication circuit 2010 may be any type of device or system that enables communication with an external device and/or a network, and may comprise, but is not limited to, a modem, a network card, an infrared communication device, a wireless communication device and/or a chipset, such as a Bluetooth device, a 1302.11 device, a WiFi device, a WiMax device, a cellular communication device, and/or the like.

According to some implementations, the electronic device 2000 may further comprise an input device 2011. The input device 2011 may be any type of device capable of inputting information to the electronic device 2000, and may comprise, but is not limited to, various sensors, a mouse, a keyboard, a touch screen, a button, a joystick, a microphone, a remote controller, and/or the like.

According to some implementations, the electronic device 2000 may further comprise an output device 2012. The output device 2012 may be any type of device capable of presenting information, and may comprise, but is not limited to, a display, a visual output terminal, a vibrator, a printer, and/or the like. Although the electronic device 2000 is used for a device for assisting the visually impaired according to some embodiments, a vision-based output device may assist a family member of the user, a maintenance staff, etc. in obtaining output information from the electronic device 2000.

According to some implementations, the electronic device 2000 may further comprise a processor 2001. The processor 2001 may be any type of processor and may comprise, but is not limited to, one or more general purpose processors and/or one or more dedicated processors (for example, special processing chips). The processor 2001 may be, for example, but is not limited to, a central processing unit (CPU) or a microprocessor unit (MPU). The electronic device 2000 may further comprise a working memory 2002. The working memory 2002 may be a working memory that stores programs (comprising instructions) and/or data (for example, an image, characters, a voice, and other intermediate data) useful to the working of the processor 2001, and may comprise, but is not limited to, a random access memory and/or read-only memory device. The electronic device 2000 may further comprise a storage device 2003. The storage device 2003 may be configured to store the above lists 801-807. The storage device 2003 may comprise any non-transitory storage device. The non-transitory storage device may be non-transitory and may be any storage device capable of implementing data storage, and may comprise, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or codes. The working memory 2002 and the storage device 2003 may be collectively referred to as "memories", and may be interchangeably used in some cases.

According to some implementations, the processor 2001 may control and schedule at least one of the communication circuit 2010, the electronic circuit 2100, and other various apparatuses and circuits comprised in the electronic device 2000. According to some implementations, at least some of the constituent parts described in FIG. 15 may be interconnected and/or communicate with each other through a line 2013.

Software elements (programs) may be located in the working memory 2002, and comprise, but are not limited to, an operating system 2002a, one or more application programs 2002b, drive programs, and/or other data and codes.

According to some implementations, the instructions for the above-mentioned control and scheduling may be comprised in the operating system 2002a or the one or more application programs 2002b.

According to some implementations, the instructions for performing the method operation described in the present disclosure may be comprised in the one or more application programs 2002b, and the above-mentioned modules of the electronic device 2000 may be implemented by the processor 2001 reading and executing the instructions of the one or more application programs 2002b. In other words, the electronic device 2000 may comprise the processor 2001 and a memory (for example, the working memory 2002 and/or the storage device 2003) that stores a program, the program comprising instructions that, when executed by the processor 2001, cause the processor 2001 to perform the method of various embodiments of the present disclosure.

According to some implementations, some or all of the operations performed by at least one of the electronic circuits 2100 may be implemented by the processor 2001 reading and executing the instructions of the one or more application programs 2002b.

Executable code or source code of the instructions of the software elements (programs) may be stored in a non-transitory computer-readable storage medium (for example, the storage device 2003), and may be stored into the working memory 2002 when executed (may be compiled and/or installed). Therefore, the present disclosure provides a computer-readable storage medium storing a program, the program comprising instructions that, when executed by a processor of an electronic device (for example, a device for assisting the visually impaired), cause the electronic device to perform the method of various embodiments of the present disclosure. According to another implementation, the executable codes or source codes of the instructions of the software elements (programs) may also be downloaded from a remote position.

It should also be understood that various variations may be made according to specific requirements. For example, custom hardware may also be used, and/or various circuits, units, modules, or elements may be implemented by using hardware, software, firmware, middleware, microcode, hardware description languages, or any combination thereof. For example, some or all of the circuits, units, modules, or elements comprised in the disclosed methods and devices may be implemented by programming hardware (for example, a programmable logic circuit comprising a field programmable gate array (FPGA) and/or a programmable logic array (PLA)) in an assembly language or a hardware programming language (such as VERILOG, VHDL, and C++) by using the logic and algorithm according to the present disclosure.

According to some implementations, the processor 2001 in the electronic device 2000 may be distributed over a network. For example, some processing may be executed by one processor while other processing may be executed by another processor away from the one processor. Other modules of the electronic device 2000 may also be similarly distributed. In this way, the electronic device 2000 can be interpreted as a distributed computing system that performs processing at a plurality of positions.

The present disclosure provides a method for pre-allocating memory for forward calculation for a neural network, comprising: performing the following calculation operation for each successive layer of the neural network from a first layer of the neural network: attempting, for each output from a current layer, to obtain a memory block identifier from a list of idle memory block identifiers that is used to record idle memory block identifiers; if the memory block identifier is obtained, storing, as a mapping relationship, the identifier of the output and the obtained memory block identifier into the mapping table of outputs and memory block identifiers, and deleting the memory block identifier from the list of idle memory block identifiers, wherein the mapping table of outputs and memory block identifiers is used to record an identifier of each output from the layer and the corresponding memory block identifier; or if the memory block identifier is not obtained, creating a new memory block identifier, storing, as a mapping relationship, an identifier of the output and the new memory block identifier into a mapping table of outputs and memory block identifiers, and putting the new memory block identifier into a general list of memory block identifiers that is used to record all of the new memory block identifiers, for creating, according to the general list of memory block identifiers during the forward calculation for the neural network, a memory block required for the forward calculation for the neural network; for each input to the current layer, putting, into the list of idle memory block identifiers, a memory block identifier corresponding to an output from a previous layer as the input if the output from the previous layer as the input is not used as an input to a subsequent layer of the current layer.

Each memory block identifier corresponds to a memory block capacity. According to some embodiments, if the memory block capacity corresponding to the memory block identifier obtained from the list of idle memory block identifiers is less than a capacity required by the output, the memory block capacity corresponding to the memory block identifier is expanded.

According to some embodiments, the obtaining a memory block identifier from a list of idle memory block identifiers that is used to record an idle memory block identifier comprises: selecting, as the memory block identifier having a mapping relationship with the output, a corresponding idle memory block identifier with the largest memory block capacity from the plurality of idle memory block identifiers if there are a plurality of idle memory block identifiers in the list of idle memory block identifiers, and the memory block capacities corresponding to the plurality of idle memory block identifiers are all less than the capacity required by the output.

According to some embodiments, the expanding the memory block capacity corresponding to the memory block identifier if the memory block capacity corresponding to the memory block identifier obtained from the list of idle memory block identifiers is less than the capacity required by the output comprises: for the idle memory block identifier selected from the plurality of idle memory block identifiers and corresponding to the largest memory block capacity, expanding the memory block capacity corresponding to the memory block identifier to be at least equal to the capacity required by the output.

According to some embodiments, the expanding the memory block capacity corresponding to the memory block identifier if the memory block capacity corresponding to the memory block identifier obtained from the list of idle memory block identifiers is less than the capacity required by the output comprises: expanding, the memory block capacity corresponding to the memory block identifier according to the capacity required by the output, so that the memory block capacity is at least equal to the capacity required by the output.

According to some embodiments, the obtaining the memory block identifier from the list of idle memory block identifiers that is used to record the idle memory block identifiers comprises: if there are a plurality of idle memory block identifiers in the list of idle memory block identifiers, comparing the memory block capacity corresponding to each of the plurality of idle memory block identifiers with the capacity required by the output, and selecting, as the memory block identifier having a mapping relationship with the output, the idle memory block identifier corresponding to the memory block capacity that has the smallest difference from the capacity required by the output in the memory block capacities from the idle memory block identifiers whose corresponding memory block capacities are greater than or equal to the capacity required by the output.

According to some embodiments, the capacity required by the output is determined from a data size and a data type of the output.

According to some embodiments, the method further comprises: before the calculation operation, constructing a set of inputs and a set of outputs respectively for each layer of the neural network, wherein each element in the set of inputs for each layer comprises an identifier a data size, and a memory block pointer pointing to a memory block address for storing the input for each input of the layer, and each element in the set of outputs of each layer comprises an identifier of each output from the layer, a data size, and a memory block pointer pointing to a memory block address for storing the output for each output of the layer.

According to some embodiments, the method further comprises: before performing the calculation operation, counting, as the number of times of citation of the output, the number of times for which each output in the neural network is used as the input to the subsequent layer of the output, and generating a correspondence table of outputs and the number of times of citation that is used to record a mapping relationship between each output and the number of times of citation of the output.

According to some embodiments, the counting, as the number of times of citation of the output, the number of times for which each output in the neural network is used as the input to the subsequent layer of the output, and generating the correspondence table of outputs and the number of times of citation that is used to record the mapping relationship between each output and the number of times of citation of the output comprises: for each layer of the neural network, obtaining each input to the current layer, determining whether there is a mapping relationship between the output from the previous layer as the input and the number of times of citation of the output in the correspondence table of outputs and the number of times of citation, and if yes, incrementing the number of times of citation of the output from the previous layer by a unit number; and obtaining each output from the current layer, creating the output and the number of times of citation of the output as a mapping relationship in the correspondence table of outputs and the number of times of citation, wherein the number of times of citation having a mapping relationship with the output is initialized to a first specific value.

According to some embodiments, for each layer, the performing the calculation operation for each layer further comprises: updating the correspondence table of outputs and the number of times of citation by decrementing the number of times of citation of the output from the previous layer as the input to the current layer by the unit number.

According to some embodiments, the putting, if the output from a previous layer as the input is not used as the input to the subsequent layer of the current layer, the memory block identifier corresponding to the output from the previous layer as the input into the list of idle memory block identifiers comprises: if the number of times of citation of the output from the previous layer becomes a second specific value after being decremented by the unit number, putting the memory block identifier corresponding to the output from the previous layer into the list of idle memory block identifiers.

According to some embodiments, the obtained or created memory block identifier and the corresponding memory block capacity are stored, as a mapping relationship, into a mapping table of used memory block identifiers and capacities that is used to record the memory block identifiers used in the current layer and the corresponding memory block capacities, and the content block capacity of the corresponding memory block identifier is updated in the mapping table of used memory block identifiers and capacities in response to the expansion of the memory block capacity.

According to some embodiments, the mapping relationship between identifiers of all outputs of the neural network and corresponding memory block identifiers is stored in the mapping table of outputs and memory block identifiers.

According to some embodiments, the method further comprises the following memory allocation operation: creating a memory block pointer for each memory block identifier in the general list of memory block identifiers; and associating, according to the mapping relationship recorded in the mapping table of outputs and memory block identifiers, an output from each layer with the memory block pointer of the memory block identifier having the mapping relationship with the output.

The present disclosure further provides a device for pre-allocating memory for forward calculation for a neural network, the device comprising: a calculation unit configured to perform the following operation for each successive layer of the neural network from a first layer of the neural network: attempting, for each output from a current layer, to obtain a memory block identifier from a list of idle memory block identifiers that is used to record idle memory block identifiers; if the memory block identifier is obtained, storing, as a mapping relationship, an identifier of the output and the obtained memory block identifier into a mapping table of outputs and memory block identifiers, and deleting the memory block identifier from the list of idle memory block identifiers, wherein the mapping table of outputs and memory block identifiers is used to record an identifier of each output from the layer and the corresponding memory block identifier; or if the memory block identifier is not obtained, creating a new memory block identifier, storing, as a mapping relationship, the identifier of the output and the new memory block identifier into the mapping table of outputs and memory block identifiers, and putting the new memory block identifier into a general list of memory block identifiers that is used to record all of the new memory block identifiers, for creating, according to the general list of memory block identifiers during the forward calculation for the neural network, a memory block required for the forward calculation for the neural network; and for each input to the current layer, putting, into the list of idle memory block identifiers, a memory block identifier corresponding to an output from a previous layer as the input if the output from the previous layer as the input is not used as an input to a subsequent layer of the current layer.

According to some embodiments, the device further comprises a pre-allocation unit configured to: create a memory block pointer for each memory block identifier in the general list of memory block identifiers; and associate, according to the mapping relationship recorded in the mapping table of outputs and memory block identifiers, an output from each layer with the memory block pointer of the memory block identifier having the mapping relationship with the output.

The present disclosure further provides an electronic circuit. The electronic circuit comprises a circuit configured to perform the operation of one of the methods described above. The present disclosure further provides an electronic device, the electronic device comprising: a processor; and a memory that stores a program, the program comprising instructions that, when executed by the processor, cause the processor to perform one of the methods described above. The present disclosure further provides a non-transitory computer-readable storage medium that stores a program, the program comprising instructions that, when executed by a processor of an electronic device, cause the electronic device to perform one of the methods described above.

Although the embodiments or examples of the present disclosure have been described with reference to the drawings, it should be understood that the methods, systems and devices described above are merely exemplary embodiments or examples, and the scope of the present disclosure is not limited by the embodiments or examples, but is only defined by the scope of the claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various manners. It is important that, as the technology evolves, many elements described herein may be replaced with equivalent elements that appear after the present disclosure.

What is claimed is:

1. A method for pre-allocating memory for forward calculation for a neural network, the method comprising:
    performing, for each middle layer of the neural network in succession, a retrieving operation to obtain a memory block identifier for each output for the middle layer from a first list that is used to record idle memory block identifiers;
        if the memory block identifier is obtained, storing, as a mapping relationship, an identifier of the output and the obtained memory block identifier into a first mapping table, and deleting the memory block identifier from the first list, wherein the first mapping table is used to record an identifier of each output from the layer and the corresponding memory block identifier; or
        if the memory block identifier is not obtained, creating a new memory block identifier, storing, as a mapping relationship, the identifier of the output and the new memory block identifier into the first mapping table, and putting the new memory block identifier into a second list that is used to record new memory block identifiers, for creating, during the forward calculation for the neural network, a memory block for each new memory block identifier in the second list, for use by the forward calculation for the neural network; and
        for each input to the middle layer, putting, into the first list, a memory block identifier corresponding to an output from a previous layer when the output from the previous layer is the input to the middle layer, and is not used as an input to a subsequent layer of the middle layer.

2. The method according to claim 1, wherein each memory block identifier corresponds to a memory block capacity; and
    when the memory block capacity corresponding to the memory block identifier obtained from the first list is less than a capacity required by the output, the memory block capacity corresponding to the memory block identifier is expanded.

3. The method according to claim 2, wherein the obtaining of the memory block identifier from the first list comprises:
    selecting, from a plurality of idle memory block identifiers in the first list, an idle memory block identifier corresponding to a largest memory block capacity as the memory block identifier having a mapping relationship with the output when each of the plurality of idle memory block identifiers corresponds to a memory block capacity that is less than the capacity required by the output,
    wherein the expanding of the memory block capacity corresponding to the selected memory block identifier comprises:
        expanding the memory block capacity corresponding to the selected memory block identifier to be at least equal to the capacity required by the output.

4. The method according to claim 2, wherein the expanding of the memory block capacity corresponding to the memory block identifier comprises:
    expanding, according to the capacity required by the output, the memory block capacity corresponding to the memory block identifier to a memory block capacity that is at least equal to the output required capacity.

5. The method according to claim 2, wherein the capacity required by the output is determined from a data size and a data type of the output.

6. The method according to claim 2, wherein the obtained or created memory block identifier and the corresponding memory block capacity are stored, as a mapping relationship, into a second mapping table that is used to record memory block identifiers used in the middle layer and the corresponding memory block capacities, and wherein a content block capacity of a corresponding memory block identifier is updated in the second mapping table in response to an expansion of a memory block capacity corresponding to the memory block identifier.

7. The method according to claim 1, wherein each memory block identifier corresponds to a memory capacity;
    wherein the obtaining of the memory block identifier from the first list comprises:
        comparing the memory block capacity corresponding to each of the idle memory block identifiers in the first list with a capacity required by the output;
        identifying, based on the comparison, a plurality of idle memory block identifiers from the idle memory block identifiers in the list, wherein each of the plurality of identified idle memory block identifiers corresponding to a memory block capacity that is greater or equal to the capacity required by the output; and
        selecting, from the plurality of identified idle memory block identifiers, an idle memory block identifier corresponding to a memory block capacity that has a smallest difference from the capacity required by the output.

8. The method according to claim 1, the method further comprising:
    before the retrieving operation, constructing a set of inputs and a set of outputs respectively for each layer of the neural network,
    wherein each element in the set of inputs for each layer comprises an identifier, a data size, and a memory block pointer pointing to a memory block address for storing the input for each input of the layer, and each element in the set of outputs of each layer comprises an identifier of each output, a data size, and a memory block pointer pointing to a memory block address for storing the output for each output of the layer.

9. The method according to claim 1, the method further comprising:
    before performing the retrieving operation, counting, as a number of times of citation of the output, the number of times for which each output in the neural network is used as the input to the subsequent layer of the output, and generating a correspondence table to record a mapping relationship between each output and the number of times of citation of the output.

10. The method according to claim 9, wherein the counting of the number of times for which each output in the neural network is used as the input to the subsequent layer of the output, and the generating of the correspondence table comprises:
for each layer of the neural network,
obtaining each input to the middle layer, determining whether there is a mapping relationship between the output from the previous layer as the input and the number of times of citation of the output in the correspondence table, and if yes, incrementing the number of times of citation of the output from the previous layer by a unit number; and
obtaining each output from the middle layer, creating the output and the number times of citation of the output as a mapping relationship in the correspondence table, wherein the number of times of citation having a mapping relationship with the output is initialized to a first specific value.

11. The method according to claim 10, the method further comprising:
updating the correspondence table by decrementing the number of times of citation of the output from the previous layer as the input to the middle layer by the unit number.

12. The method according to claim 11, wherein the putting of the memory block identifier corresponding to the output from the previous layer as the input into the first list comprises:
when the number of times of citation of the output from the previous layer becomes a second specific value after being decremented by the unit number, putting the memory block identifier corresponding to the output from the previous layer into the first list.

13. The method according to claim 1, wherein the mapping relationships between identifiers of all outputs of the neural network and corresponding memory block identifiers are stored in the first mapping table.

14. The method according to claim 1, the method further comprising:
creating a memory block pointer for each memory block identifier in the second list; and
associating, according to the mapping relationship recorded in the first mapping table, an output from each layer with the memory block pointer of the memory block identifier having the mapping relationship with the output.

15. An electronic device, comprising:
a processor; and
a memory storing a program, the program comprising instructions that, when executed by the processor, cause the processor to perform the following operations:
performing, for each middle layer of a neural network in succession, a retrieving operation to obtain a memory block identifier for each output for the middle layer from a first list that is used to record idle memory block identifiers;
if the memory block identifier is obtained, storing, as a mapping relationship, an identifier of the output and the obtained memory block identifier into a first mapping table, and deleting the memory block identifier from the first list, wherein the first mapping table is used to record an identifier of each output from the layer and the corresponding memory block identifier; or
if the memory block identifier is not obtained, creating a new memory block identifier, storing, as a mapping relationship, the identifier of the output and the new memory block identifier into the first mapping table, and putting the new memory block identifier into a second list that is used to record new memory block identifiers, for creating, during a forward calculation for the neural network, a memory block for each new memory block identifier in the second list, for use by the forward calculation for the neural network; and
for each input to the middle layer, putting, into the first list, a memory block identifier corresponding to an output from a previous layer when the output from the previous layer is the input to the middle layer, and is not used as an input to a subsequent layer of the middle layer.

16. The electronic device according to claim 15, wherein each memory block identifier corresponds to a memory block capacity; and
when the memory block capacity corresponding to the memory block identifier obtained from the first list is less than a capacity required by the output, the memory block capacity corresponding to the memory block identifier is expanded.

17. The electronic device according to claim 16, wherein the obtaining of the memory block identifier from the first list comprises:
selecting, from a plurality of idle memory block identifiers in the first list, an idle memory block identifier corresponding to a largest memory block capacity as the memory block identifier having a mapping relationship with the output when each of the plurality of idle memory block identifiers corresponds to a memory block capacity that is less than the capacity required by the output,
wherein the expanding of the memory block capacity corresponding to the selected memory block identifier comprises:
expanding the memory block capacity corresponding to the selected memory block identifier to be at least equal to the capacity required by the output.

18. The electronic device according to claim 16, wherein the expanding of the memory block capacity corresponding to the memory block comprises:
expanding, according to the capacity required by the output, the memory block capacity corresponding to the memory block identifier to a memory block capacity that is at least equal to the output required capacity.

19. The electronic device according to claim 15, wherein each memory block identifier corresponds to a memory capacity;
wherein the obtaining of the memory block identifier from the first list comprises:
comparing the memory block capacity corresponding to each of the idle memory block identifiers in the first list with a capacity required by the output;
identifying, based on the comparison, a plurality of idle memory block identifiers from the idle memory block identifiers in the list, wherein each of the plurality of identified idle memory block identifiers corresponding to a memory block capacity that is greater or equal to the capacity required by the output; and
selecting, from the plurality of identified idle memory block identifiers, an idle memory block identifier corresponding to a memory block capacity that has a smallest difference from the capacity required by the output.

20. A non-transitory computer-readable storage medium storing a program, the program comprising instructions that, when executed by a processor of an electronic device, cause the electronic device to perform the following operations:

performing, for each middle layer of a neural network in succession, a retrieving operation to obtain a memory block identifier for each output for the middle layer from a first list that is used to record idle memory block identifiers;

if the memory block identifier is obtained, storing, as a mapping relationship, an identifier of the output and the obtained memory block identifier into a first mapping table, and deleting the memory block identifier from the first list, wherein the first mapping table is used to record an identifier of each output from the layer and the corresponding memory block identifier; or if the memory block identifier is not obtained, creating a new memory block identifier, storing, as a mapping relationship, the identifier of the output and the new memory block identifier into the first mapping table, and putting the new memory block identifier into a second list that is used to record new memory block identifiers, for creating, during a forward calculation for the neural network, a memory block for each new memory block identifier in the second list, for use by the forward calculation for the neural network; and for each input to the middle layer, putting, into the first list, a memory block identifier corresponding to an output from a previous layer when the output from the previous layer is the input to the middle layer, and is not used as an input to a subsequent layer of the middle layer.

* * * * *